United States Patent [19]

Foran et al.

[11] Patent Number: 5,190,996
[45] Date of Patent: Mar. 2, 1993

[54] WATER RESISTANT FORMALDEHYDE-FREE CORRUGATING ADHESIVE COMPOSITIONS

[75] Inventors: Michael Foran, Somerville; Jules Schoenberg, Scotch Plains; Dilip Ray-Chaudhuri, Bridgewater, all of N.J.

[73] Assignee: National Starch and Chemical Investment Holding Corporation, Wilmington, Del.

[21] Appl. No.: 467,601

[22] Filed: Jan. 19, 1990

[51] Int. Cl.$^5$ ............................ C08L 1/08; C08L 3/08; B32B 3/00
[52] U.S. Cl. ........................................ 524/28; 524/44; 524/47; 524/55; 524/445; 428/260; 428/261; 428/262; 427/414
[58] Field of Search .................. 525/57, 58; 524/28, 524/44, 47, 55, 445; 156/327, 328, 330, 330.9, 336; 264/286; 427/414; 428/260, 261, 262

[56] References Cited

U.S. PATENT DOCUMENTS

| | | | |
|---|---|---|---|
| 2,051,025 | 8/1936 | Bauer | 156/208 |
| 2,102,937 | 12/1937 | Bauer | 106/213 |
| 3,019,120 | 1/1962 | Bauer et al. | 106/213 |
| 3,359,223 | 12/1967 | Nakamura et al. | 524/48 |
| 3,666,751 | 5/1972 | Jarowenko et al. | 536/50 R |
| 3,737,370 | 6/1973 | Jarowenko et al. | 162/175 |
| 3,836,376 | 9/1974 | Hampton et al. | 106/213 |
| 3,854,970 | 12/1974 | Aitken | 106/210 |
| 3,912,531 | 10/1975 | Musselman et al. | 106/213 |
| 3,939,109 | 2/1976 | Barie, Jr. et al. | 524/876 |
| 4,018,959 | 4/1977 | Demko et al. | 428/182 |
| 4,359,341 | 11/1982 | Allen | 106/213 |
| 4,366,275 | 12/1982 | Silano et al. | 524/47 |
| 4,400,480 | 8/1983 | Silano et al. | 524/47 |
| 4,424,291 | 1/1984 | Leake et al. | 524/47 |
| 4,444,943 | 4/1984 | Kawakami et al. | 524/512 |
| 4,568,714 | 2/1986 | Overholt | 524/25 |
| 4,787,937 | 11/1988 | Leake | 106/213 |

OTHER PUBLICATIONS

"Webster's New International Dictionary of the English Language", 2nd Ed. pp. 32, 2351 (1956).
Japanese Patent Laid-Open Sho-55-54371 (English Translation) Dainippon-Ink-Kagaku-Kogy-KK, Improved Starch Paste (Apr. 21, 1980).

*Primary Examiner*—Nathan M. Nutter
*Assistant Examiner*—Jeffrey Culpeper Mullis
*Attorney, Agent, or Firm*—Eugene Zagarella, Jr.; Jane E. Gennaro; Edwin M. Szala

[57] ABSTRACT

This invention presents water-resistant, formaldehyde-free starch-based corrugating adhesives. The adhesives are alkaline-curing and contain 0.1-7% (by wt.) of a crosslinking agent which is a condensate of an epihalohydrin and an amine, a polyamine, or ammonia.

21 Claims, No Drawings

WATER RESISTANT FORMALDEHYDE-FREE CORRUGATING ADHESIVE COMPOSITIONS

BACKGROUND OF THE INVENTION

This invention relates to a starch-based, formaldehyde-free adhesive composition suitable for use in the preparation of paperboard. The adhesive of the present invention may be used to provide formaldehyde-free corrugated paper products which possess a high degree of water resistance.

As used herein the term "corrugated paperboard" refers to a fluted medium and a facing adhesively joined to the tips on one or both sides of the fluted medium.

The procedures employed in the production of corrugated paperboard usually involve a continuous process wherein a strip of paperboard is first corrugated by means of heated, fluted rolls. The protruding tips on one side of this fluted paperboard strip are then coated with an adhesive, and a flat sheet of paperboard, commonly known in the trade as a facing, is thereafter applied to these tips. By applying heat and pressure to the two paperboard strips thus brought together, an adhesive bond is formed therebetween. The above-described procedure produces what is known to those skilled in the art as a single-faced board in that the facing is applied to only one surface thereof. If a double-faced paperboard is desired, in which an inner fluted layer is sandwiched between two facings, a second operation is performed wherein the adhesive is applied to the exposed tips of the single-faced board and the adhesive-coated tips are then pressed against a second facing in the combining section of the corrugator under the influence of pressure and heat. The typical corrugating process and the use or operation of corrugators in general are described in U.S. Pat. Nos. 2,051,025 and 2,102,937 issued on Aug. 18, 1936 and Dec. 21, 1937, respectfully to Bauer, both incorporated herein by reference.

The particular adhesive employed in the corrugating process is selected on the basis of several factors, including the type of bond required in the final application of the finished corrugated product. Starch-based adhesives are most commonly used due to their desirable adhesive properties, low cost and ease of preparation.

The most fundamental of the starch-based corrugating adhesives is an alkaline adhesive which is comprised of raw ungelatinized starch suspended in an aqueous dispersion of cooked starch, described in U.S. Pat. No. 2,102,937 to Bauer, incorporated by reference above. The adhesive is produced by gelatinizing starch in water with sodium hydroxide (caustic soda) to yield a primary mix of gelatinized (or cooked) carrier, which is then slowly added to a secondary mix of raw (ungelatinized) starch and water (and, optionally, borax) to produce the full-formulation adhesive. In the corrugating process, the adhesive is applied (usually at a temperature between 20° and 55° C.) to the tips of the fluted paper medium or single-faced board, whereupon the application of heat causes the raw starch to gelatinize, resulting in an instantaneous increase in viscosity and formation of the adhesive bond. However, such adhesives are very water sensitive and the bonds formed often fail when the corrugated board is wet.

Because it is often desired or necessary in the manufacture of corrugated paperboard that the adhesive yield water-resistant bonds which can withstand extended exposure to high humidity, liquid water, melting ice and the like, a number of approaches have been devised to produce water-resistant corrugating adhesives. One method involves the preparation of an acidic, starch-based adhesive wherein urea-formaldehyde resin is added to the composition, together with an acidic catalyst such as aluminum sulfate, to produce water-resistant bonds in the corrugated board manufactured therewith. This adhesive composition itself, however, is deficient in other important properties such as corrugator bonding speeds (since the bond forms slowly under acidic conditions), viscosity stability, and pot life and exhibits excessive formaldehyde odor due to the liberation of formaldehyde from the cured adhesive. In addition, acidic corrugating adhesives tend to be corrosive.

The many disadvantages associated with the acidic corrugating adhesives prompted the development of water-resistant alkaline curing starch-based adhesives for use in the corrugating industry. In the preparation thereof, a thermosetting resin, such as, e.g., urea-formaldehyde, resorcinol-formaldehyde, melamine-formaldehyde, phenol-formaldehyde, diacetone acrylamide-formaldehyde, ketone-aldehyde and urea-acetone-formaldehyde condensate, has been added to the adhesive as a crosslinking additive for the amylaceous components to produce water-resistant bonds. Such adhesives are quite stable and can be run at high corrugator speeds.

However, as the scientific community is becoming aware of the hazards of formaldehyde, efforts have been accelerated to reduce exposure of the public, both in the home and workplace. Thus, the presence of formaldehyde in these adhesives makes them unsatisfactory for use in corrugated board, particularly in board used in applications, such as food packaging.

In response to this, a number of researches have tried to reduce or eliminate formaldehyde in corrugating adhesives. For example, U.S. Pat. No. 4,400,480 discloses an adhesive which contains an acetone-formaldehyde condensate low in free formaldehyde. U.S. Pat. No. 4,775,706 discloses formaldehyde-free corrugating adhesives containing a crosslinking agent comprising a halohydrin quaternary ammonium monomer. Also, Japanese Patent Laid-Open Sho-55-54371 discloses a starch paste crosslinked with a polyamide epihalohydrin condensate, copolymerized with an ethylenically unsaturated monomer.

The above methods, however, can result in undesirable adhesives which still contain formaldehyde (in smaller quantities). Further, in the cases where formaldehyde is eliminated entirely, the adhesives often require the crosslinking agent to be a major component, making it undesirable in many applications.

Accordingly, it is an object of this invention to present a formaldehyde-free corrugating adhesive which cures under alkaline conditions and exhibits a satisfactory degree of water resistance. It is further an object of this invention to present adhesives which can be obtained easily and do not require the use of large quantities of the crosslinking agent.

SUMMARY OF THE INVENTION

The above and related objects are achieved by the starch-based corrugating adhesives of the instant invention. These adhesives are alkaline-curing and contain a crosslinking agent produced by the reaction of an amine, a polyamine, or ammonia and an epihalohydrin; as used herein, the term polyamine designates a compound possessing two or more amine functionalities, wherein said compound preferably has a molecular weight of 200 or less. The amount of crosslinking agent used in the adhesive will vary as the particular application varies, but generally ranges from 0.1 to 7.0% (by weight of resin solids based on starch). Above 7%, the water resistance of the adhesive is not appreciably enhanced (and may actually decrease), while below 0.1%, the water resistance is usually too low for use in most applications. The use of high amylose starch permits the use of quantities of crosslinking agent at the lower end, while conventional starches, such as corn starch, require higher amounts to achieve the same degree of water resistance.

The use of the crosslinking agent, which does not contain formaldehyde, permits the adhesive bond to have a high degree of water resistance similar to that of conventional thermoset resins. While not wishing to be bound by theory, it is postulated that when the adhesive is applied to the fluted corrugating medium and heated in a corrugating process, the heat causes both the starch to gelatinize and the crosslinking agent to crosslink the starch. This produces a bond which is both strong and water-resistant, resulting in water resistant corrugated board possessing the same properties.

DETAILED DESCRIPTION OF THE INVENTION

The starch components of the adhesive compositions of the invention, which may be wholly ungelatinized, partially swelled, or consist of both gelatinized (carrier) and ungelatinized (raw) portions, may be selected from any of the several starches, native or converted, heretofore employed in starch corrugating adhesive compositions. Suitable starches include, for example, those starches derived from corn, potato, waxy maize, sorghum, wheat, tapioca as well as high-amylose starches, (i.e., starches which contain 50% or more by weight of amylose), and the various derivatives of these starches such as ethers, esters, thin-boiling types prepared by known processes such as mild acid treatments, oxidation, etc. As stated previously, high amylose starches are preferred for use, particularly as the gelatinized portion in the two-part raw/carrier adhesives, since such starches permit the use of lower quantities of crosslinking agents to achieve the same degree of water resistance. Other preferred starches are those typically employed in corrugating adhesives of the alkaline type.

The starch content of the adhesive can vary considerably depending on several factors such as the intended end-use application of the adhesive and the type of starch used. The total amount of starch employed, including gelatinized and ungelatinized portions of starch, ordinarily will be in the range of about 10-50% (the remainder being primarily water), preferably 20-50% by total weight of the adhesive. In compositions where no gelatinized starch is employed, ungelatinized or partially swelled starch will be present in amounts ranging from about 10 to 50%, preferably 10-30% for ungelatinized starch and 20-50% for partially swelled starch.

The alkali (base) employed herein is preferably sodium hydroxide; however, other bases may be employed in partial or full replacement of the sodium hydroxide and include, for example, alkali metal hydroxides such as potassium hydroxide, alkaline earth hydroxides such as calcium hydroxide, alkaline earth oxides such as barium oxide, alkali metal carbonates such as sodium carbonate, and alkali metal silicates such as sodium silicate. The alkali is preferably employed in aqueous form in amounts sufficient to provide the adhesive with a pH of about 7.5 to 13, and preferably 10 to 13.

The crosslinking agents used in the adhesive compositions of this invention are prepared by the reaction of an epihalohydrin, preferably epichlorohydrin, with an amine, a polyamine or ammonia to form a polyamine/epichlorhydrin condensate. During the reaction, which is preferably conducted at 15°-60° C. the epihalohydrin reacts with an amine group to yield the functional group

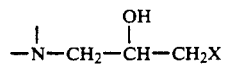

where X=halogen, which readily undergoes condensation with the hydroxyl groups of starch under alkaline conditions.

In preparing these agents the epihalohydrin is added slowly to an aqueous solution of the amine, polyamine, or ammonia with cooling, and the epichlorohydrin is permitted to react to completion. The product produced is then brought to pH 4 with a strong acid, such as $HNO_3$, to prevent self-condensation.

Alternatively, the amine can be partially preneutralized with the acid prior to the addition of the epihalohydrin. In such a case, the polyamine is initially admixed with up to 0.5 mole of the acid per mole of polyamine. Such preneutralization gives fewer side reactions (e.g., self-condensation), and results in a more uniform product.

Since the functional group containing the halohydrin reacts with a starch, the crosslinking agents must have an average of at least two halohydrin groups per molecule to permit crosslinking to occur. In fact, this number could be, and in many cases is, well in excess of two, depending on the number of amines available for reaction. Further, it should be noted that each amine group can react with more than one epihalohydrin group, so long as the amine does not contain a positive charge.

Preferred amines useful as the crosslinking agents are organic amines containing at least two primary or secondary amine groups per molecule. Preferred organic polyamines include diethylenetriamine, triethylenetetramine, and N-(2-aminoethyl)ethanolamine. Also useful are lower molecular weight monoamines containing a single primary amine, and ammonia, although the polyamines are preferred for their versatility.

The crosslinking agents are admixed with the starch portion of the adhesive at some point prior to application of the adhesive to the corrugating medium. The actual addition level will depend on the nature of the starch portion as well as the ultimate application, but will generally range from 0.1-7% (by weight of resin solids based on starch solids), preferably 2-6%.

In addition to the four essential ingredients (starch, water, base, and crosslinking agent) of the adhesive composition of this invention, any conventional additives ordinarily found in the corrugating adhesives may be incorporated into the adhesive in minor amounts, if desired. Such additives include, for example, preservatives; defoamers; wetting agents; plasticizers; solubilizing agents; rheology modifiers; water conditions; penetration control agents; peptizers such as urea; gelatinization temperature modifiers; inert fillers such as clay and finely ground polymers; thickeners such as inorganic collodial clays, guar, hydroxyethyl cellulose, alginates, polyvinyl alcohol, polymers of ethylene oxide; tackifiers such as boron-containing salts (e.g., borax pentahydrate or decahydrate); and emulsifiers such as polyvinyl acetate. In certain instances, i.e., those in which the presence of some formaldehyde in the adhesives is not objectionable, it is contemplated that small amounts of formaldehyde containing resins (e.g., urea-formaldehydes, melamine formaldehydes, etc.) could also be added.

In preparation of the adhesive compositions of this invention, there are several different ways in which the ingredients can be added depending, for example, on the adhesive solids desired, the equipment available, and whether or not gelatinized starch is present in the composition. In adhesives where gelatinized starch is employed, the starch is typically gelatinized in water with caustic soda and then slowly added to a slurry of raw starch and water. The crosslinking agent may be added to the raw starch mixture or to the final adhesive mixture as desired. In adhesives without a gelatinized starch component, rheology is often improved by the addition of thickeners such as those described above. Such adhesives are typically prepared by dissolving the thickener in water and thereafter adding the raw starch, crosslinking agent, and alkali or mixtures thereof to the thickened dispersion. The order of addition of the adhesive components is not critical to the water resistance exhibited.

The adhesives herein can be used to bond single- or double-faced boards using any equipment which is presently employed for the preparation of corrugated board. Thus, the adhesive is usually maintained at a temperature of between 20° and 55° C. before its application to the protruding tips of the fluted paper strip. The actual application may be accomplished by the use of glue rolls which are ordinarily employed in most corrugating machines, or one may, if desired, utilize other application methods which may be able to achieve a different distribution of adhesive. Following the application of the adhesive to the fluted paper strip, the latter is then brought into immediate contact with the facing board under the influence of heat and pressure, as is well known in the art. A double-faced board may be subsequently prepared by bringing a second facing in contact with the open fluted surface of the single-faced board by the usual procedures.

Any of various paperboard substrates may be utilized in combination with the adhesive composition of the present invention in order to provide corrugated paperboard. As the corrugating adhesive of the present invention provides water resistant properties, it is usually desirable to utilize a wet-strength paperboard, in combination with the adhesive in order to provide a corrugated paperboard product with greater water resistant properties, although such is not required.

The following examples illustrate certain preferred embodiments of this invention but are not intended to be illustrative of all embodiments.

EXAMPLE I—PREPARATION OF STARCH-BASED CORRUGATING ADHESIVES

All corrugating adhesives were prepared in the same manner as described in the Bauer patents previously incorporated by reference. Briefly, the adhesives were two part adhesives prepared by combining a cooked or gelatinous carrier starch with a raw ungelatinized starch. In the preparation, the carrier component is prepared by combining the water and starch with NaOH (in aqueous solution) and incubating the system with agitation at 60° C. (140° F.) for 10 to 20 minutes. The reaction was then discontinued by addition of the quench water.

The raw starch component was prepared by combining the starch and water at about 30° C. (90° F.) and adding the borax (pentahydrate), as required. The system is then agitated for five minutes, after which the carrier component is added. The adhesive was subsequently used in the experiments.

Three adhesives having the following formulas were prepared:

TABLE I

| Component | Adhesive A | Adhesive B | Adhesive C |
|---|---|---|---|
| Carrier | | | |
| Water | 2502 gm | 3294 gm | 2502 gm |
| Starch[1] | 1200 gm | 395 gm | 1200 gm |
| Caustic/ | 96 gm | 86.8 gm | 96 gm |
| Water | 250 gm | 580 gm | 250 gm |
| Quench | 2502 gm | 3294 gm | 2502 gm |
| Raw | | | |
| Water | 7506 gm | 7538 gm | 7506 gm |
| Starch[2] | 4200 gm | 2905 gm | 4206 gm |
| Borax | 72 gm | 65 gm | none |

[1]Starch was high amylose cornstarch for A and C, and standard cornstarch for B.
[2]Starch was standard cornstarch for A, B, and C.

These adhesives were used in subsequent examples.

EXAMPLE II—EFFECT OF DIFFERING ADDITION LEVELS OF CROSSLINKING AGENT

In this example, the effect of different amounts of crosslinking agent on the ultimate adhesive properties was determined. In the trials, the crosslinking agent was prepared by reacting diethylenetriamine and epichlorohydrin in the desired ratio (1:4 mole/mole) at 15° C. using the preneutralization procedure described previously.

Briefly, 31 gm diethylene triamine (0.3 mole) was added to a solution of 54 gm 17.5% aqueous (0.15 mole) $HNO_3$ and 60 ml of water with cooling. Once the addition was complete, the temperature was cooled to 16° C. and 110 gm of epichlorohydrin (1.2 mole) was added dropwise over about 4 hours (temperature was maintained at about 15° C. during this time). After the addition was complete, the system was periodically monitored (by gas chromatography) for the presence of free epichlorohydrin; once this level was below 100 ppm, the pH was brought to 4.0 using 17.5% aqueous $HNO_3$ and the crosslinking agent was isolated under vacuum distilling of approximately 10% of the water to remove any low boiling impurities.

In each experiment the adhesive was admixed with the desired quantity of crosslinking agent, and the resultant adhesive was applied at 6 mil thickness with a Bird applicator to a glass plate and was transferred to sheets of single-face web (of 62 lb./1000 ft.$^2$ (0.302 kg./m.$^2$) wet strength liner and 30 lb./1000 ft.$^2$ (0.106 kg./m.$^2$) wet strength medium) by means of direct hand pressure. The single-face samples were then placed on top of 62 lb./1000 ft.$^2$ (0.302 kg./m.$^2$) wet strength liner and the resultant double-faced board was bonded at 0.25 psi on a hot plate at 177° C. for 5 seconds.

The bonded boards were then placed in a conditioning atmosphere of 22° C., 50% relative humidity for 24 hours, after which 2×4 inch samples of each of the boards were placed in water at 22° C. for 24 hours.

At the end of this period the samples were evaluated by a wet pin adhesion test based on that of the TAPPI Standard UM 802 (formerly R 337) using a Hinde and Dauch Crush Tester obtainable from Testing Machines Incorporated, Mineola, N.Y. The test results were recorded in pounds (per 8 square inches) at the point of initial bond failure of the double-face liner from the single-face web. The results are indicated in Table II as the average of six replicate trials.

TABLE II

| Adhesive | Crosslinking Agent Addition Level (% by weight of resin solids on Starch) | Wet Pin Adhesion (lb) |
| --- | --- | --- |
| A | 0 | 0–2 |
| A | 0.18 | 6.9 |
| A | 0.35 | 9.2 |
| A | 0.7 | 17.7 |
| A | 1.4 | 19.3 |
| A | 2.8 | 23.8 |
| A | 5.6 | 17.0 |
| A | 7.0 | 8.3 |

As shown, it can be seen that addition levels as low as 0.18% produce some degree of water resistance, while at 5.6%, for this particular resin, the water resistance begins to decrease. For other resins, this decrease is observed in excess of 5.6%.

The crosslinking agents used in the subsequent examples were prepared at temperatures up to 30° C., using both the preneutralization and non-preneutralization procedures.

EXAMPLE III—EFFECT OF VARYING AMINE/EPIHALOHYDRIN RATIO

In this example, adhesives were made utilizing crosslinking agents having differing amine/epihalohydrin ratios at a 2.8% addition level. In each trial, DETA/epichlorohydrin of different ratios, made by the procedure of Example II, were used, to make adhesives, and the wet pin adhesion was evaluated as described in Example II. The results are presented in Table III.

TABLE III

| Adhesive | DETA/epi ratio (mole/mole) | Wet Pin Adhesion (lb) |
| --- | --- | --- |
| A | 1:1 | 3.5 |
| A | 1:2 | 8.2 |
| A | 1:3 | 17.6 |
| A | 1:4 | 23.8 |

As shown, an increase in the ratio increases water resistance.

EXAMPLE IV—EFFECT OF VARYING CROSSLINKING AGENTS

In this example, the effect of varying the amine reacted with epichlorohydrin to form the crosslinking agents was examined. In each, the listed amine was reacted with epichlorohydrin in the stated ratio (mole/mole), and used to form an adhesive at an addition rate of 2.8%. The wet pin adhesion values of these adhesives were evaluated as in Example II. The results are summarized in Table III.

TABLE IV

| Adhesive | Amine Source | Amine Source/epi ratio (mole/mole) | Wet Pin Adhesion (lb) |
| --- | --- | --- | --- |
| A | none (no crosslinking agent) | — | 0–2 |
| A | N-(2-aminoethyl) ethanolamine | 1:2 | 14.2 |
| A | triethylenetetramine | 1:3.7 | 16.6 |
| A | Ammonia | 1:2 | 14.6 |
| A | DETA | 1:3 | 17.6 |

As shown, all amine sources gave satisfactory wet pin adhesion values, but DETA was the best.

EXAMPLE V—EFFECT OF DIFFERING STARCHES

This example examined the effect of using standard conventional cornstarch in the carrier portion of the adhesive, Adhesive B. At an addition level of 2.8% resin solids based on starch solids, Adhesive B containing the crosslinking agent exhibited a wet pin adhesion of 15.4, while B with no crosslinking agent exhibited no water resistance.

Thus, the crosslinking agents of this invention can be used with a variety of starches, and do not require the use of high amylose carriers.

EXAMPLE VI—EFFECT OF NON-BORAX ADHESIVES

This example examined the effect of the crosslinking agents on adhesives without the tackifier borax (C) as compared with the standard adhesive (A). The crosslinking agents were prepared having the cited DETA/epi ratios using the procedure of Example II. The results are presented in Table V.

TABLE V

| Adhesive | DETA/epi ratio | Wet Pin Adhesion |
| --- | --- | --- |
| A | — | 0 |
| C | — | 0 |
| C | 1:2 | 8.2 |
| C | 1:2.5 | 11.5 |
| A | 1:2 | 8.2 |
| A | 1:3 | 12.5 |

As shown, the adhesives without borax exhibited satisfactory water resistance.

It is apparent that many modifications and variations of this invention as hereinabove set forth may be made without departing from the spirit and scope thereof. The specific embodiments described are given by way of example only and the invention is limited only by the terms of the appended claims.

What is claimed is:

1. A formaldehyde-free, water-resistant starch, alkaline curing corrugating adhesive composition comprising:
   (i) from about 0.1 to 7%, by weight of resin solids based on starch of a crosslinking agent, prepared by reacting an amine, a polyamine, or ammonia with an epihalohydrin to form an eplhalohydrin/polyamine condensate;
   (ii) from about 10–50%, based on total weight of the adhesive, of a starch component comprising an ungelatinized starch, a partially swollen starch or a mixture of ungelatinized and gelatinized starch;
   (iii) from about 50–90%, based on total weight of the adhesive, of water;

(iv) sufficient alkali to provide the adhesive with pH of about 7.5 to 13; and (v) a tackifying amount of a boron-containing salt.

2. The corrugating adhesive of claim 1, wherein the starch is selected from the group consisting of corn, potato, waxy maize, sorghum, wheat, tapioca, and high amylose starches, and mixtures thereof.

3. The corrugating adhesive of claim 1, wherein the boron-containing salt is borax.

4. The corrugating adhesive of claim 1, further comprising a thickener selected from the group consisting of hydroxyethyl cellulose, guar, inorganic colloidal clay, alginate, polyvinyl alcohol and polymers of ethylene oxide.

5. The corrugating adhesive of claim 1, wherein the epihalohydrin is epichlorohydrin.

6. The corrugating adhesive of claim 1, wherein the polyamine is selected from the group consisting of diethylenetriamine, triethylenetetramine, and N-(2-aminoethyl)ethanolamine.

7. The corrugating adhesive of claim 1, wherein there is one epihalohydrin molecule per amine group.

8. The corrugating adhesive of claim 1, wherein there is more than one epihalohydrin molecule per amine group.

9. The corrugating adhesive of claim 1, wherein the alkali is NaOH.

10. The corrugating adhesive of claim 1, wherein the crosslinking agent comprises a condensate of epichlorohydrin and diethylenetriamine.

11. The corrugating adhesive of claim 10, wherein the ratio of epichlorohydrin to diethylenetriamine is at least 1:2 (mole/mole).

12. The corrugating adhesive of claim 1, wherein the crosslinking agent has an average of at least two halohydrin groups per molecule.

13. A process for preparing corrugated paperboard comprising the steps of:
(a) applying to the tips of the corrugations of a fluted paper strip a formaldehyde-free, water-resistant, alkaline curing corrugating adhesive composition comprising:
  (i) from about 01-7%, by weigh of resin solids based on starch of a crosslinking agent, prepared by reacting an amine, a polyamine, or ammonia with an epihalohydrin to form an epihalohydrin/polyamine condensate;
  (ii) from about 10-50%, based on total weight of the adhesive of a starch component comprising an ungelatinized starch, a partially swollen starch or a mixture of ungelatinized and gelatinized starch;
  (iii) from about 50-90%, based on total weight of the adhesive, of water; and
  (iv) sufficient alkali to provide the adhesive with a ph of about 7.5 to 13; and
(b) applying a facing to the adhesive-coated tips of said fluted paper strip to form an adhesive bond.

14. The process of claim 13, wherein the epihalohydrin is epichlorohydrin.

15. The process of claim 14, wherein the polyamine is selected from the group consisting of diethylenetriamine, triethylenetetramine, and N-(2-aminoethyl) ethanolamine.

16. The process of claim 14, wherein there is one epihalohydrin molecule per amino group.

17. The process of claim 14, wherein there is more than one epihalohydrin molecule per amino group.

18. The process of claim 14, wherein the crosslinking agent comprises a condensate of epichlorohydrin and diethylenetriamine.

19. The process of claim 14, wherein the ratio of epichlorohydrin to diethylenetriamine is at least 2:1 (mole/mole).

20. A corrugated paperboard product prepared by the process of claim 13.

21. A corrugated paperboard product prepared by employing a formaldehyde-free, water-resistant, alkaline curing corrugating adhesive composition comprising:
  (i) from about 0.1 to 7%, by weight of resin solids based on starch of a crosslinking agent, prepared by reacting an amine, a polyamine, or ammonia with an epihalohydrin to form an epihalohydrin/polyamine condensate;
  (ii) from about 10-50%, based on total weight of the adhesive, of a starch component comprising an ungelatinized starch, a partially swollen starch or a mixture of ungelatinized and gelatinized starch;
  (iii) from about 50-90%, based on total weight of the adhesive, of water; and
  (iv) sufficient alkali to provide the adhesive with a pH of about 7.5 to 13.

* * * * *